United States Patent
Ishihata et al.

(10) Patent No.: US 8,448,988 B2
(45) Date of Patent: May 28, 2013

(54) VEHICLE SYSTEM INCLUDING A STRUCTURE IN WHICH EXHAUST HEAT RECOVERY APPARATUS IS INSTALLED

(75) Inventors: Takato Ishihata, Takahama (JP); Mamoru Yashima, Nagoya (JP); Yoshihiro Kamiya, Anjo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 535 days.

(21) Appl. No.: 12/226,604

(22) PCT Filed: Apr. 23, 2007

(86) PCT No.: PCT/IB2007/001975
§ 371 (c)(1),
(2), (4) Date: Oct. 23, 2008

(87) PCT Pub. No.: WO2007/125418
PCT Pub. Date: Nov. 8, 2007

(65) Prior Publication Data
US 2010/0115934 A1    May 13, 2010

(30) Foreign Application Priority Data
Apr. 28, 2006  (JP) ................................ 2006-126129

(51) Int. Cl.
*B60K 13/04*    (2006.01)
*B62D 21/15*    (2006.01)
*B62D 25/20*    (2006.01)

(52) U.S. Cl.
USPC .............................. 280/781; 280/784; 60/324

(58) Field of Classification Search
USPC ................... 280/784, 781; 180/296, 291, 309, 180/200, 204; 60/324
See application file for complete search history.

(56) References Cited

U.S. PATENT DOCUMENTS

| 4,163,578 A | * | 8/1979 | Watson | 296/204 |
| 5,195,780 A | * | 3/1993 | Inoue et al. | 280/834 |
| 7,032,961 B2 | * | 4/2006 | Matsuda | 296/204 |
| 7,383,912 B2 | * | 6/2008 | Kondo et al. | 180/296 |
| 2005/0046236 A1 | | 3/2005 | Nakamura et al. | |
| 2006/0207245 A1 | * | 9/2006 | Yamaguchi et al. | 60/320 |

FOREIGN PATENT DOCUMENTS

| CN | 1590195 A | 8/2004 |
| EP | 1 408 209 A1 | 4/2004 |
| JP | A-3-45416 | 2/1991 |
| JP | A-2002-70528 | 3/2002 |
| JP | A-2002-160536 | 6/2002 |
| JP | A-2004-132320 | 4/2004 |
| JP | A-2005-16477 | 1/2005 |
| JP | A-2005-54662 | 3/2005 |
| JP | A-2006-89038 | 4/2006 |

OTHER PUBLICATIONS

Apr. 29, 2011 Office Action in related Chinese Application No. CN200780015444.0 w/English translation.

* cited by examiner

*Primary Examiner* — Kenneth Bomberg
*Assistant Examiner* — Dapinder Singh
(74) *Attorney, Agent, or Firm* — Oliff & Berridge, PLC

(57) ABSTRACT

An exhaust heat recovery apparatus is installed below a floor supported by both side members of a vehicle to recover heat from exhaust gas passing through an exhaust pipe of an internal combustion engine. Assistance members, which extend in the fore-and-aft direction of the vehicle, are provided between the both side members of the vehicle. The exhaust heat recovery apparatus is installed close to one of the assistance members.

10 Claims, 2 Drawing Sheets

VEHICLE SYSTEM INCLUDING A STRUCTURE IN WHICH EXHAUST HEAT RECOVERY APPARATUS IS INSTALLED

BACKGROUND OF THE INVENTION

1. Field of the Invention

The invention relates to a vehicle structure in which an exhaust heat recovery apparatus is installed around the exhaust pipe of a vehicle.

2. Description of the Related Art

It is preferable to quickly warm up an internal combustion engine when the internal combustion engine is cold. Accordingly, an exhaust heat recovery apparatus may be installed around the exhaust pipe of the internal combustion engine. That is, a coolant for the internal combustion engine circulates in the exhaust heat recovery apparatus so that heat is transferred from exhaust gas to the coolant, and the coolant is warmed. Thus, warming-up is quickly performed when the internal combustion engine is cold. As a result, it is possible to quickly improve emissions from the internal combustion engine.

Because the exhaust pipe is positioned below the floor of the vehicle, when the vehicle, in which the exhaust heat recovery apparatus is installed around the exhaust pipe, has a lateral collision, a portion of the floor close to the exhaust heat recovery apparatus may be deformed to protrude downward, and the exhaust heat recovery apparatus may be damaged. If the coolant that circulates in the exhaust heat recovery apparatus leaks or stops circulating due to the damage, the coolant circulating in the internal combustion engine may be insufficient, and the internal combustion engine may not be sufficiently cooled.

Japanese Patent Application Publication No. 2002-160536 (JP-A-2002-160536) describes a vehicle structure in which a conventional exhaust pipe is installed. In the conventional exhaust pipe, the exhaust heat recovery apparatus is not installed.

SUMMARY OF THE INVENTION

The invention provides a vehicle structure in which an exhaust heat recovery apparatus is installed, and which suppresses damage to the exhaust heat recovery apparatus when a vehicle has a lateral collision.

A first aspect of the invention relates to a vehicle structure in which an exhaust heat recovery apparatus is installed below a floor supported by both side members of a vehicle to recover heat from exhaust gas passing through an exhaust pipe of an internal combustion engine. In the vehicle structure, an assistance member, which extends in the fore-and-aft direction of the vehicle, is provided between the both side members. The exhaust heat recovery apparatus is installed close to the assistance member.

With this configuration, because the assistance member, which extends in the fore-and-aft direction of the vehicle, is provided between the both side members, deformation of the floor is suppressed at the time of a vehicle collision. As a result, it is possible to suppress damage to the exhaust heat recovery apparatus, when the vehicle has a lateral collision.

The vehicle structure according to a second aspect of the invention is similar to the vehicle structure according to the first aspect, except that the exhaust heat recovery apparatus is installed such that the upper surface of the exhaust heat recovery apparatus is positioned below the upper surface of the assistance member in a vertical direction.

With this configuration, the exhaust heat recovery apparatus is installed such that the upper surface of the exhaust heat recovery apparatus is positioned below the upper surface of the assistance member in the vertical direction. Therefore, when the floor is deformed downward at the time of a vehicle collision, the assistance member can receive a portion of the floor close to the exhaust heat recovery apparatus. As a result, it is possible to further suppress damage to the exhaust heat recovery apparatus, when the vehicle has a lateral collision.

The vehicle structure according to a third aspect of the invention is similar to the vehicle structure according to the second aspect, except that a cross member which extends in the lateral direction of the vehicle, and which supports the floor is provided. One end of the assistance member is connected to one of the side members, and the other end of the assistance member is connected to the cross member.

With this configuration, one end of the assistance member is connected to one of the side members, and the other end of the assistance member is connected to the cross member. Therefore, when the vehicle has a lateral collision, an impact applied to the lateral portion of the vehicle is transmitted from a portion of the assistance member close to the side member to a portion of the assistance member close to the cross member. Thus, collision energy is dispersed, and deformation of the floor is suppressed.

The vehicle structure according to a fourth aspect of the invention is similar to the vehicle structure according to a third aspect, except that the exhaust heat recovery apparatus is positioned close to the cross member.

With this configuration, the assistance member and the cross member are positioned close to the exhaust heat recovery apparatus. Therefore, it is possible to further suppress deformation of a portion of the floor close to the exhaust heat recovery apparatus.

The vehicle structure according to a fifth aspect of the invention is similar to the vehicle structure according to any one of the first to fourth aspects, except that the assistance member is provided on each of both sides of the exhaust heat recovery apparatus in the lateral direction of the vehicle.

With this configuration, the assistance member is provided on each of both sides of the exhaust heat recovery apparatus. Therefore, it is possible to further suppress deformation of the portion of the floor close to the exhaust heat recovery apparatus at the time of a collision, and to improve the strength of the body of the vehicle.

The vehicle structure according to a sixth aspect of the invention is similar to the vehicle structure according to any one of the first to fifth aspects, except that the exhaust heat recovery apparatus is supported by the assistance member.

With this configuration, the exhaust heat recovery apparatus is supported by the assistance member that is positioned close to the exhaust heat recovery apparatus. Therefore, it is possible to stabilize the exhaust heat recovery apparatus, and to suppress vibration and noise caused by the vibration.

The vehicle structure according to a seventh aspect of the invention is similar to the vehicle structure according to the fifth aspect, except that the exhaust heat recover apparatus is positioned closer to one of the assistance members provided on both sides of the exhaust heat recovery apparatus than to the other of the assistance members. The exhaust heat recovery apparatus is supported by the one of the assistance members.

With this configuration, the exhaust heat recovery apparatus is positioned closer to one of the assistance members provided on both sides of the exhaust heat recovery apparatus than to the other of the assistance members. Also, the exhaust heat recovery apparatus is supported by the one of the assistance members. Therefore, it is possible to easily support the heat recovery apparatus using the one of the assistance members, while improving the strength of the body of the vehicle using the two assistance members.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXAMPLE EMBODIMENTS

Figure 1:
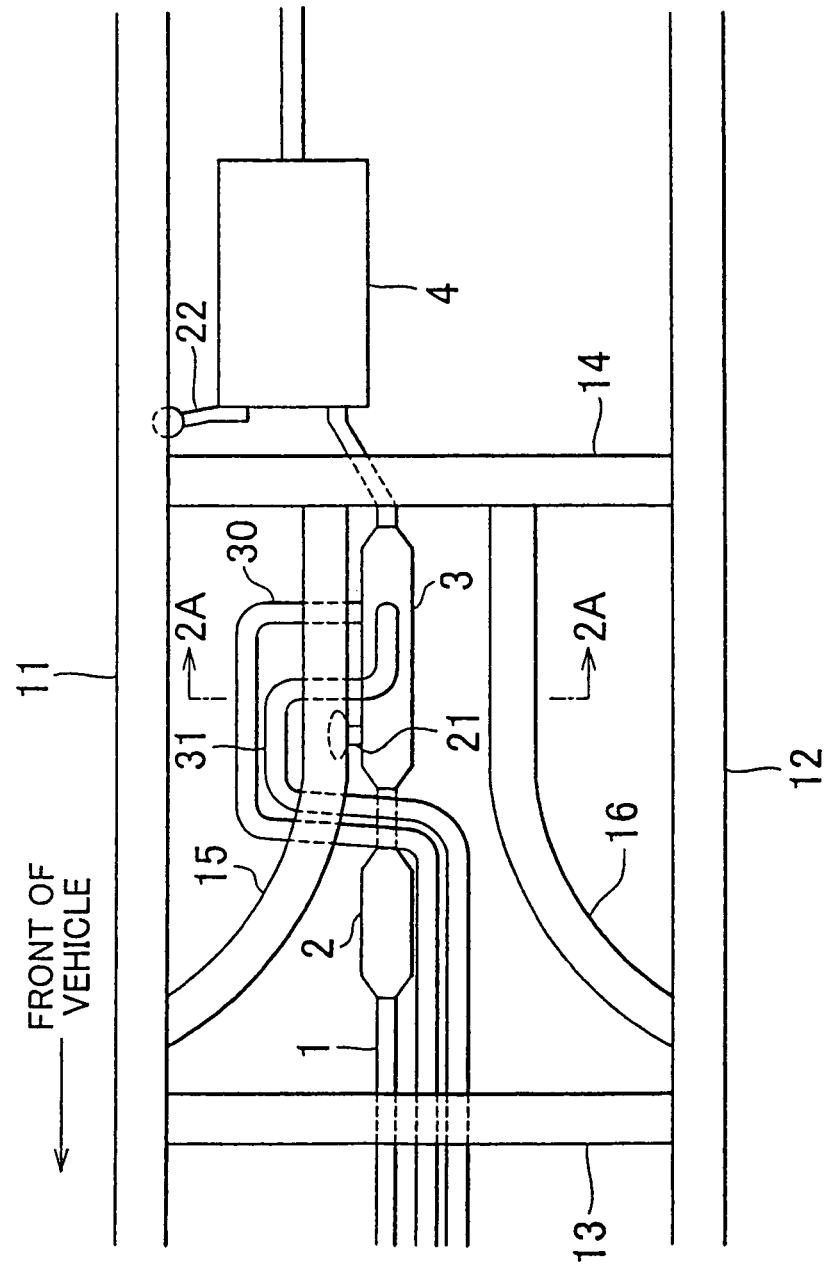
FIG. 1 is a plan view showing a vehicle structure in which an exhaust heat recovery apparatus is installed.

Hereinafter, an embodiment of the invention will be described with reference to FIG. 1 and FIG. 2. FIG. 1 is a plan view showing a vehicle structure in which an exhaust heat recovery apparatus is installed. As shown in FIG. 1, the vehicle is provided with side members 11 and 12, and cross members 13 and 14. The side members 11 and 12 extend in the fore-and-aft direction of the vehicle. The cross members 13 and 14 extend in the lateral direction of the vehicle. The side member 11 is provided in the right lower portion of the vehicle. The side member 12 is provided in the left lower portion of the vehicle. One end of each of the cross members 13 and 14 is connected to the side member 11. The other end of each of the cross members 13 and 14 is connected to the side member 12. The cross member 13 is provided ahead of the cross member 14 in the vehicle (hereinafter, the cross member 13 will be sometimes referred to as "anterior cross member 13", and the cross member 14 will be sometimes referred to as "posterior cross member 14"). Assistance members 15 and 16 are provided between the side members 11 and 12. The assistance member 15 is connected to the side member 11 in the right portion of the vehicle, and to the posterior cross member 14. The assistance member 15 is positioned in the right portion of the vehicle. The assistance member 16 is connected to the side member 12 in the left portion of the vehicle, and to the posterior cross member 14. The assistance member 16 is positioned in the left portion of the vehicle. The assistance members 15 and 16 are symmetrically provided. The side members 11 and 12, cross members 13 and 14, and assistance members 15 and 16 support the floor (not shown) of the vehicle.

An exhaust pipe 1 is provided below the floor supported by the side members 11 and 12, cross members 13 and 14, and assistance members 15 and 16. Exhaust gas discharged from an internal combustion engine (not shown) passes through the exhaust pipe 1. In the exhaust pipe 1, a catalytic converter 2, an exhaust heat recovery apparatus 3, and a main muffler 4 are installed in the stated order from the upstream side of the exhaust pipe 1 (i.e., the side close to the internal combustion engine). The catalytic converter 2 purifies exhaust gas. The exhaust heat recovery apparatus 3 recovers the heat from the exhaust gas passing through the exhaust pipe 1. The exhaust heat recovery apparatus 3 is connected to an inlet pipe 30 and an outlet pipe 31. A coolant that circulates in the internal combustion engine is guided to the exhaust heat recovery apparatus 3 from the internal combustion engine through the inlet pipe 30. The coolant that circulates in the internal combustion engine is guided to the internal combustion engine from the exhaust heat recovery apparatus 3 through the outlet pipe 31. The exhaust heat recovery apparatus 3 is positioned between both of the assistance members 15 and 16. The exhaust heat recovery apparatus 3 is positioned closer to the assistance member 15 in the right portion of the vehicle than to the assistance member 16 in the left portion of the vehicle. The exhaust heat recovery apparatus 3 is positioned ahead of the posterior cross member 14, and close to the posterior cross member 14. The exhaust heat recovery apparatus 3 is supported by the assistance member 15 in the right portion of the vehicle, via a support member 21. The main muffler 4 is supported by the side member 11 in the right portion of the vehicle, via a support member 22.

Figure 2:
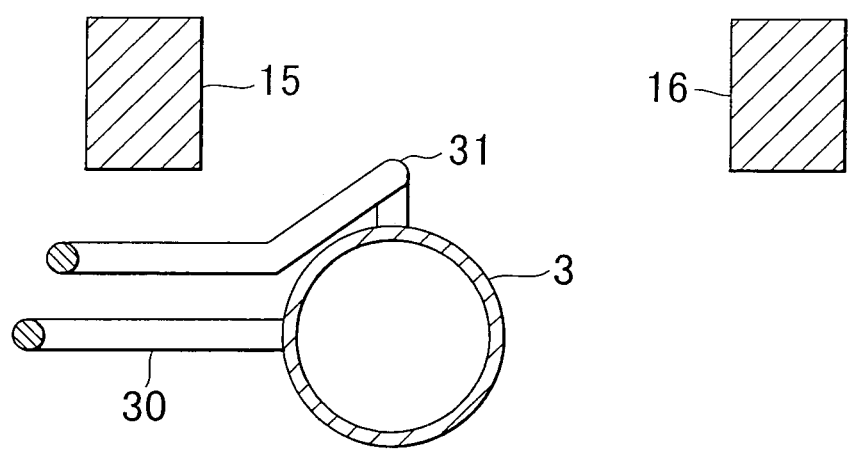
FIG. 2 is a cross sectional view taken along line 2A-2A in FIG. 1.

FIG. 2 is a cross sectional view taken along line 2A-2A in FIG. 1. As shown in FIG. 2, the outlet pipe 31 is connected to an upper portion of the outer peripheral surface of the exhaust heat recovery apparatus 3 in a vertical direction. The exhaust heat recovery apparatus 3 is installed such that the upper surfaces of the exhaust heat recovery apparatus 3 and the outlet pipe 31 are positioned below the upper surfaces of the assistance members 15 and 16 in the vertical direction. There is a predetermined distance between the outlet pipe 31 and the assistance member 15 in the right portion of the vehicle.

According to the embodiment that has been described, the following effects are obtained. (1) The assistance members 15 and 16, which extend in the fore-and-aft direction of the vehicle, are provided between the side members 11 and 12. Therefore, deformation of the floor is suppressed at the time of a vehicle collision. As a result, it is possible to suppress damage to the exhaust heat recovery apparatus 3, when the vehicle has a lateral collision.

(2) The exhaust heat recovery apparatus 3 is installed such that the upper surface of the exhaust heat recovery apparatus 3 is positioned below the upper surfaces of the assistance members 15 and 16 in the vertical direction. Therefore, when the floor is deformed downward at the time of a vehicle collision, the assistance members 15 and 16 can receive the portion of the floor close to the exhaust heat recovery apparatus 3. As a result, it is possible to further suppress damage to the exhaust heat recovery apparatus 3, when the vehicle has a lateral collision.

(3) One end of the assistance member 15 is connected to the side member 11, and one end of the assistance member 16 is connected to the side member 12. The other end of each of the assistance members 15 and 16 is connected to the cross member 14. Therefore, when the vehicle has a lateral collision, an impact applied to the lateral portion of the vehicle is transmitted from a portion of the assistance member 15 or 16 close to the side member 11 or 12 to a portion of the assistance member 15 or 16 close to the cross member 14. Thus, collision energy is dispersed, and deformation of the floor is suppressed.

(4) The assistance member 15 and the cross member 14 are positioned close to the exhaust heat recovery apparatus 3. Therefore, it is possible to further suppress deformation of the portion of the floor close to the exhaust hear recovery apparatus 3.

(5) The assistance members 15 and 16 are provided on both sides of the exhaust heat recovery apparatus 3 in the lateral direction of the vehicle. Therefore, it is possible to further suppress deformation of the portion of the floor close to the exhaust heat recovery apparatus 3 at the time of a collision, and to improve the strength of the body of the vehicle.

(6) The exhaust heat recovery apparatus 3 is supported by the assistance member 15 positioned close to the exhaust heat recovery apparatus 3. Therefore, it is possible to stabilize the exhaust heat recovery apparatus 3, and to suppress vibration and noise caused by the vibration.

(7) The exhaust heat recovery apparatus 3 is positioned closer to the assistance member 15 provided on one side of the exhaust heat recovery apparatus 3 than to the assistance member 16 provided on the other side of the exhaust heat recovery apparatus 3. The exhaust heat recovery apparatus 3 is supported by the assistance member 15. Therefore, it is possible to easily support the exhaust heat recovery apparatus 3 being positioned close to one of the assistance members 15 and 16, while improving the strength of the body using the two assistance members 15 and 16.

The above-described embodiment may be appropriately modified as follows. In the above-described embodiment, the exhaust heat recovery apparatus 3 is installed closer to the assistance member 15 in the right portion of the vehicle than to the assistance member 16 in the left portion of the vehicle. However, the exhaust heat recovery apparatus 3 may be installed closer to the assistance member 16 in the left portion of the vehicle than to the assistance member 15 in the right portion of the vehicle. Alternatively, the exhaust heat recovery apparatus 3 may be installed between both of the assistance members 15 and 16. In this case, when the floor is deformed downward, it is possible to suppress damage to the exhaust heat recovery apparatus 3.

In the above-described embodiment, the exhaust heat recovery apparatus 3 is supported by the assistance member 15 in the right portion of the vehicle. However, the exhaust heat recovery apparatus 3 may be supported by the side member or the cross member. In the above-described embodiment, the assistance member is provided on each of both sides of the exhaust heat recovery apparatus 3. However, the assistance member may be provided on only one side of the exhaust heat recovery apparatus 3. In this case, the rigidity of the right portion of the vehicle may be made equal to the rigidity of the left portion of the vehicle.

In the above-described embodiment, the exhaust heat recovery apparatus 3 is positioned close to the posterior cross member 14. However, the exhaust heat recovery apparatus 3 need not be positioned close to the cross member, as long as deformation of the floor is suppressed.

In the above-described embodiment, one end of the assistance member is connected to the side member, and the other end of the assistance member is connected to the posterior cross member 14. However, depending on the position of the exhaust heat recovery apparatus 3, one end of the assistance member may be connected to the anterior cross member 13, and the other end of the assistance member may be connected to the side member.

In the above-described embodiment, one end of the assistance member is connected to the side member. However, one end of the assistance member may be connected to the anterior cross member 13, as long as sufficient rigidity to endure an impact applied at the time of a lateral collision is maintained. In this case, it is possible to increase the rigidity against an impact applied at a frontal collision or a rear-end collision.

In the above-described embodiment, the upper surface of the exhaust heat recovery apparatus 3 is positioned below the upper surfaces of both of the assistance members 15 and 16 in the vertical direction. However, the upper surface of the exhaust heat recovery apparatus 3 may be positioned above the upper surfaces of both of the assistance members 15 and 16 in the vertical direction. In this case, there is a higher possibility that the floor may interfere with the exhaust heat recovery apparatus 3 when the floor is deformed downward at the time of a vehicle collision. However, the distance between the exhaust heat recovery apparatus 3 and a road surface is long.

The invention claimed is:

1. A vehicle system comprising:
an exhaust heat recovery apparatus that is installed below a floor of a vehicle, the vehicle having an internal combustion engine;
a muffler;
an exhaust pipe;
an outlet pipe that connects the exhaust heat recovery apparatus to the internal combustion engine of the vehicle; and
a vehicle structure, the vehicle structure comprising a plurality of support members, wherein the plurality of support members include
a first support member;
a second support member;
a first side member;
a second side member;
a first lateral support member; and
a second lateral support member, the first lateral support member and the second lateral support member being provided on both sides of the exhaust heat recovery apparatus in a transverse direction of the vehicle, wherein
the first support member connects the first lateral support member to the exhaust heat recovery apparatus,
the second support member connects the first side member to the muffler,
the exhaust heat recovery apparatus is closer to a front of the vehicle than the muffler, and
both the first lateral support member and the second lateral support member: i) extend partially in a parallel direction and partially in an oblique direction, with respect to a longitudinal axis defined by the exhaust heat recovery apparatus, and ii) are provided between the first side member and the second side member.

2. The vehicle system according to claim 1, further comprising a cross member which extends in a transverse direction of the vehicle between the first side member and the second side member, and which supports the floor.

3. The vehicle system according to claim 2, wherein one end of at least one of the first lateral support member and the second lateral support member is directly connected to one of the first side member and the second side member, and another end of the at least one of the first lateral support member and the second lateral support member is directly connected to the cross member.

4. The vehicle system according to claim 1, wherein the first lateral support member and the second lateral support member are symmetrically provided on the both sides of the exhaust heat recovery apparatus in the transverse direction of the vehicle.

5. The vehicle system according to claim 1, wherein the exhaust heat recovery apparatus is directly supported by at least one of the first lateral support member and the second lateral support member.

6. The vehicle system according to claim 1, wherein the exhaust heat recovery apparatus is supported by at least one of the first side member and the second side member.

7. The vehicle system according to claim 2, wherein the exhaust heat recovery apparatus is supported by the cross member.

8. The vehicle system according to claim 1, wherein
the exhaust heat recovery apparatus is positioned closer to one of the first lateral support member and the second lateral support member provided on both sides of the exhaust heat recovery apparatus, than to the other of the first lateral support member and the second lateral support member; and
the exhaust heat recovery apparatus is directly supported by the one of the first lateral support member and the second lateral support member.

9. The vehicle system according to claim 1, wherein the exhaust heat recovery apparatus is installed such that an upper surface of the exhaust heat recovery apparatus is positioned below lower surfaces of the first lateral support member and the second lateral support member, in a vertical direction.

10. The vehicle system according to claim 1, wherein the first side member and the second side member are configured to support the exhaust heat recovery apparatus separately from the muffler provided in the exhaust pipe below the floor, to recover heat from exhaust gas passing through the exhaust pipe.

\* \* \* \* \*